(12) United States Patent
Yamase et al.

(10) Patent No.: US 7,988,542 B1
(45) Date of Patent: Aug. 2, 2011

(54) METHOD OF SEPARATION OF BACKBONE PART OF FISH AND DEVICE THEREFOR

(75) Inventors: Shigetsugu Yamase, Redmond, WA (US); Tomoyori Tsukagoshi, Sakai (JP); Kohji Morita, Sakai (JP); Kazuharu Takeuchi, Tokyo (JP); Takao Obara, Tokyo (JP); Peter James Maloney, Redmond, WA (US)

(73) Assignees: UniSea Inc., Richmond, VA (US); Toyo Suisan Kikai Co., Ltd., Osaka (JP); Nippon Suisan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/945,336

(22) Filed: Nov. 12, 2010

(30) Foreign Application Priority Data

Oct. 4, 2010 (JP) ................................ 2010-225142

(51) Int. Cl.
*A22C 18/00* (2006.01)
(52) U.S. Cl. ...................................................... 452/150
(58) Field of Classification Search ................... 452/52, 452/63, 64, 107, 108, 149–151, 153, 154, 452/160–164
See application file for complete search history.

(56) References Cited

U.S. PATENT DOCUMENTS

| | | | | |
|---|---|---|---|---|
| 4,084,294 A | * | 4/1978 | Dohrendorf | 452/135 |
| 4,151,629 A | | 5/1979 | Braeger | |
| 4,195,387 A | * | 4/1980 | Iwase | 452/106 |
| 4,563,793 A | * | 1/1986 | Ryan | 452/110 |
| 5,554,069 A | * | 9/1996 | Burch et al. | 452/149 |
| 5,871,395 A | * | 2/1999 | Grabau et al. | 452/162 |
| 5,947,810 A | * | 9/1999 | Magnasco et al. | 452/138 |
| 6,322,437 B1 | * | 11/2001 | Grabau et al. | 452/161 |
| 6,994,617 B2 | * | 2/2006 | Jakobsen et al. | 452/161 |
| 7,081,048 B2 | * | 7/2006 | Bech | 452/161 |
| 7,090,574 B2 | * | 8/2006 | Braeger et al. | 452/162 |
| 7,427,229 B2 | * | 9/2008 | Grosseholz et al. | 452/106 |
| 7,857,686 B2 | * | 12/2010 | Arnason | 452/161 |

FOREIGN PATENT DOCUMENTS

| | | |
|---|---|---|
| JP | 2908871 B2 | 2/1999 |
| JP | 200060496 A | 2/2000 |
| JP | 200234516 A | 2/2002 |

* cited by examiner

*Primary Examiner* — Thomas Price
(74) *Attorney, Agent, or Firm* — Ronald E. Griegg

(57) ABSTRACT

To obtain a quality-meat-attached backbone part suitable as a material for minced fish the invention proposes cutting off a fin part and a kidney from a meat-attached backbone part obtained when filleting a fish into three pieces. The meat-attached backbone part is conveyed by a pair of upper and lower conveyor belts while being sandwiched and held between the belts. When the backbone part reaches a fin cutter arranged in a midstream of the conveyance, a belly part is pushed by a first pushing lever while a back part of the meat-attached backbone part is received and stopped by a receiving and stopping lever, and the back skin from a back fin to a tail fin is cut off by the fin cutter. Then, when the meat-attached backbone part reaches a kidney cutter, the belly part of the meat-attached backbone part is pushed by a second pushing lever to position the kidney-attached backbone section of the meat-attached backbone part at a cutting position by a kidney cutter. The kidney-attached backbone section is cut off by the kidney cutter to obtain the quality-meat-attached backbone part.

20 Claims, 9 Drawing Sheets

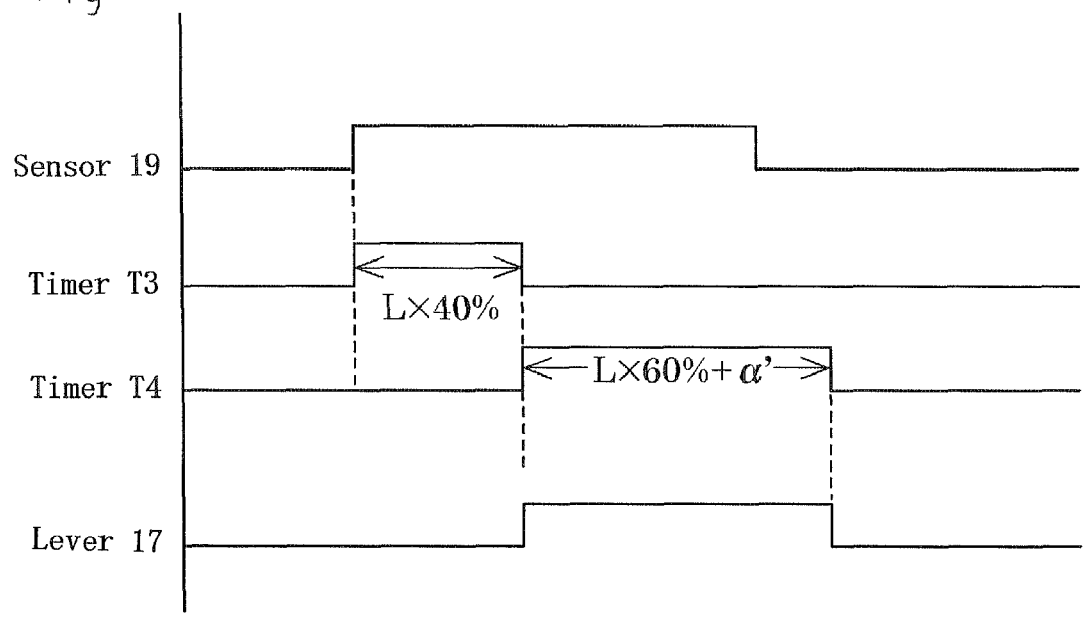

METHOD OF SEPARATION OF BACKBONE PART OF FISH AND DEVICE THEREFOR

FIELD OF THE INVENTION

This invention relates to a method of separation of a backbone part, which is obtained as a center piece when a fish like Alaskan pollack, hoki, sardine, Pacific saury or the like is filleted into three pieces, to obtain quality fish meat attached to the backbone by pre-treating with the method, and relates to a device to practice the method.

BACKGROUND OF THE INVENTION

Conventionally, a fish is filleted into three pieces of two fillets and a backbone part by a fish processing device called a filleting machine. The two fillets of quality meat are served as food while the backbone part is used in a form of fish meal or as a material for minced fish meat after collecting the meat, since the backbone part, as it is, is difficult to be served as food even though the quality meat is attached to it.

For example, according to the Patent Document 1, the fish is filleted into three pieces by the filleting machine to obtain two fillets and a backbone part. The backbone part is crushed and is minced together with the fillets to be used as a calcium-fortified ground fish-meat product or a calcium-fortified hamburger steak by which calcium contained in the bone can be consumed. Similarly, according to the Patent Document 2, the backbone part is crushed into a paste-like material and the fish bone paste is added to the fillets to obtain the minced fish-meat product to prepare the calcium-fortified ground fish-meat product as the ground fish meat prepared by using only fillets contains little calcium.

According to the Patent Document 3, the backbone part of the fish, which is filleted into three pieces, has a considerable amount of meat attached to it, and the attached meat is collected by a fish meat collecting machine to use the fish meat as an ingredient for ham and sausages. Further, the backbone after collecting the meat is crushed into a paste-like material, and the fish bone powder in the state of the paste-like material is used for the ground fish-meat product.

Further, the Patent Document 4 discloses a method and a device for separating the quality meat, which is attached to the backbone of the fish when filleted into three pieces, from the backbone part. To be specific, the backbone part is placed on a guide means arranged parallel on right and left sides at an interval in the state that a tail side of the fish is oriented in a conveying direction, and the backbone part is fed to a pair of upper and lower circular cutters arranged at a vertical interval having the same height as the diameter of a vertebral column of the backbone part so that the upper and lower circular cutters may separate back extensions and belly extensions having quality meat, from the vertebral column.

DOCUMENTS OF PRIOR ART

Patent Documents

Patent Document 1: Patent Publication No. 2002-34516 Gazette
Patent Document 2: U.S. Pat. No. 2,908,871 Gazette
Patent Document 3: Patent Publication No. 2000-60496 Gazette
Patent Document 4: U.S. Pat. No. 4,151,629 Specification

BRIEF DESCRIPTION OF THE INVENTION

Problems to be Solved

When a fish is filleted into three pieces by the filleting machine, not only a considerable amount of meat but also a back fin and a tail fin separated from the fillets are attached to the backbone part as mentioned above. Further, the belly side of the backbone includes a kidney (a bag containing clotted blood) attached section. Therefore, when the ground fish-meat product is manufactured using the backbone part as the material for the minced fish, impurities such as the fins and the kidney cause degradation in quality. Therefore, it is preferable to collect the meat attached to the backbone part by the meat collecting machine after removing the back fin, the tail fin, the kidney etc. from the backbone part, or to crush the backbone part into a paste-like material, as mentioned above, so as to be used as the material for the minced meat together with the collected meat.

However, removal of the back fin and the tail fin from the backbone part is very difficult. According to the above-mentioned Patent Document 2, they are removed by washing the backbone part. However, it is difficult to completely remove the back fin, tail fin etc. by washing. Even when they can be removed by lengthy washing, they are removed together with part of the meat attached to the backbone part, which is problematic. On the other hand, better removal may be achieved when the back fin, the tail fin, the kidney etc. are removed from the backbone part by hands, but the work efficiency is reduced.

According to the framework described in the Patent Document 4, the pair of upper and lower cutters can automatically separate the back side having the quality meat and the belly side from the backbone part. However, the cutters arranged parallel at a predetermined vertical interval carries out the separation without controlling the cutting position according to the length or the size of the backbone part. Consequently, the quality meat may be left on the vertebral column side of the backbone after separation of the back side and the belly side, causing a problem of a lower yield rate. Further, even when the back side is separated from the vertebral column of the backbone, the back fin still remains on the back part, whereby quality of the minced meat is degraded unless the back fin is removed.

This invention has been made in view of the above-mentioned problems. The object of this invention is to provide a method of separating the backbone part of a fish by which unnecessary parts including a back fin, a tail fin, a kidney etc. are cut off from the backbone part, so that a quality-meat-attached backbone section can be obtained surely and with a higher yield rate, as well as to provide a device for practicing the method.

Means to Solve the Problems

In order to achieve the above-mentioned purpose, the method of separation of the backbone part of the fish to obtain a quality-meat-attached backbone section of this invention is characterized by that a process of feeding a meat-attached backbone part, which is obtained when filleting the fish into three pieces, to a fin cutter and a kidney cutter arranged in sequence along a lateral end of mutually opposite holding faces of a pair of upper and lower conveyor belts while the meat-attached backbone part is sandwiched and held by the upper and lower conveyor belts in the state that a cut-off head side is oriented in a conveying direction and that a back side is oriented to the lateral side, and then cutting off a back part of the backbone part from a back fin to a tail fin by the fin cutter while controlling a cutting position of the fin of the backbone part relative to the fin cutter at the position of the fin cutter by a first control means, and a process of cutting off the a kidney-attached backbone section by the kidney cutter while controlling a cutting position of the kidney-attached backbone section relative to the kidney cutter at the position of the kidney cutter by a second control means. In the meantime, the "backbone part" in this invention means the part mainly including a backbone, and fish meat, fins etc. attached thereto, obtaining after filleting a fish into three pieces and removing two fillets, namely right and left fillets, according to an idiomatic expression in a fish meat processing field.

In the method of separation of the backbone part of the fish as claimed as mentioned above, the invention is characterized by that the first control means comprises a first pushing lever pushing a belly part of the backbone part and a receiving and stopping lever receiving and stopping the back part of the backbone part, in which the tail fin and the back fin are cut off in an integrated manner by cutting off the back part of the backbone part from the back fin to the part near the tail fin by the fin cutter in the state that the belly part of the backbone part sandwiched and held by the pair of upper and lower conveyor belts and brought to the fin cutter is pushed to the fin cutter by the first pushing lever and that the receiving and stopping lever receiving and stopping the back part of the backbone part is held at a position leaving the space, with respect to the fin cutter, enabling cutting off of the fin part of the backbone part, and then immediately before the tail fin of the backbone part reaches the fin cutter, the receiving and stopping operation on the back part by the receiving and stopping lever is cancelled, and at the same time the tail fin section is pushed forward further by the first pushing lever to move the backbone part to a lateral side on a cutting blade of the fin cutter, by which the backbone section of the tail fin is cut off by the cutter.

The invention is characterized by that the second control means comprises a second pushing lever pushing the belly part of the backbone part sandwiched and held by the pair of upper and lower conveyor belts immediately before reaching the kidney cutter and moving the backbone part in the direction of the width of the conveyor belts while protruding the meat part attached to the backbone part outward from a lateral end of the mutually opposite holding faces of the conveyor belts so that the kidney-attached backbone part can be separated from the meat-attached backbone part by the kidney cutter.

The invention is related to a device to practice the method of separation of the backbone part of the fish. The device comprises a pair of upper and lower conveyor belts conveying the meat-attached backbone part of the fish when the fish is filleted into three pieces, while being sandwiched and held in the state that the cut-off head side of the backbone part is oriented in the conveying direction and that the back side of the fish oriented to the lateral side of the conveyor belts, a fin cutter arranged along the lateral end of the conveyor belts and in the middle part of the conveyance, a kidney cutter arranged in sequence to the fin cutter along the lateral end of the conveyor belts and in the middle part of the conveyance, first control means arranged on a side of the fin cutter to control the cutting position of the fin of the backbone part relative to the fin cutter, and second control means arranged on a side of the kidney cutter to control the cutting position of the kidney-attached backbone section relative to the kidney cutter.

In the device for separation of the backbone part which is thus structured, the invention is characterized by that the first control means comprises a receiving and stopping lever arranged on a side of the fin cutter to maintain a cutting position of the back fin of the backbone part relative to the fin cutter by receiving and stopping the back part of the backbone part until the tail fin reaches the fin cutter when the fin cutter cuts off the fin part of the backbone part, and to release the receiving and stopping force when the tail fin is cut off, and a first pushing lever arranged on the other side of the fin cutter in a manner of facing the receiving and stopping lever in order to push the belly part of the backbone part toward the receiving and stopping lever until the tail fin reaches the fin cutter when the fin cutter cuts off the fin part of the backbone part and to release the receiving and stopping force of the receiving and stopping lever while pushing the tail fin to the lateral side through the cutting blade of the fin cutter when the tail fin is cut off.

The invention is characterized by that the second control means comprises the second pushing lever arranged on a lateral side of the conveyor belts before the kidney cutter to push the belly part side of the backbone part, from which the series of the back fin to the tail fin has been removed, to move the backbone part in the width direction of the conveyor belts to position the kidney-attached backbone section at the cutting position by the kidney cutter.

The invention is characterized by that an upstream fixed guide plate and a downstream fixed guide plate are respectively arranged between a conveyance starting end of the pair of upper and lower conveyor belts and the part before the fin cutter, and between the part immediately after the fin cutter and the part before the kidney cutter, and along the lateral end of the conveyor belts, to receive and stop the back part of the backbone part to guide the same; and that a position correcting means comprising a roller is arranged on the other lateral side of the conveyance starting end to push the belly part side of the backbone part through the space between the mutually opposite holding faces of the conveyor belts to push the back part of the backbone part against the upstream fixed guide plate.

Further, the invention is characterized by that a first detecting sensor comprising a first photoelectric sensor is arranged to detect passing time of the backbone part conveyed to the conveyance starting end part of the conveyor belts and to calculate the length of the backbone part, that a second detecting sensor comprising a second photoelectric sensor is arranged to detect the backbone part conveyed to the position before the first pushing lever and to control operation of the first pushing lever and the receiving and stopping lever according to the length of the backbone part detected by the first detecting sensor, and that a third detecting sensor comprising a third photoelectric sensor is arranged to detect the backbone part conveyed to the position before the second pushing lever and to control the operation of the second pushing lever according to the length of the backbone part detected by the first detecting sensor.

Advantages of the Invention

According to the invention, the meat-attached backbone part obtained when the fish is filleted into three pieces is conveyed by the pair of upper and lower conveyor belts while being sandwiched and held between them in the state that the cut-off head side is oriented in the conveying direction and the back part is oriented to the lateral end of the conveyor belts. When the meat-attached backbone part reaches the fin cutter arranged along the lateral end of the conveyor belts, the fin part of the backbone part from the back fin to the tail fin is cut off by the fin cutter while the cutting position of the fin relative to the fin cutter is controlled by the first control means. Next, when the quality meat attached backbone part reaches the kidney cutter arranged along the lateral end of the conveyor belts, the kidney-attached backbone section of the backbone part is cut off by the kidney cutter while the cutting position of the kidney relative to the kidney cutter is controlled by the second control means. Consequently, the quality-meat-attached backbone section can be surely obtained at a high yield rate, and quality minced fish can be obtained by using the backbone section as a material for the minced fish.

According to the invention, the first control means comprises the first pushing lever pushing the belly part of the backbone part and a receiving and stopping lever receiving and stopping the back part of the backbone part. The belly part of the backbone part brought to the fin cutter while being sandwiched and held by the pair of upper and lower conveyor belts, is pushed toward the fin cutter by the first pushing lever. The receiving and stopping lever is structured in a manner that it is held at the interval with respect to the fin cutter that enables cutting of the fin part of the backbone part and in the state that the back part of the backbone part is received and stopped by it so that the back part from the back fin to the tail fin near the tail fin can be cut off by the fin cutter. Therefore, when the backbone part passes the fin cutter, the back fin of the backbone part can be cut off quickly and accurately by the fin cutter while the backbone part is pushed against the fin cutter by the first pushing lever and is received and stopped firmly by the receiving and stopping lever. Further, immediately before the tail fin of the backbone part reaches the fin cutter, the receiving and stopping lever stops receiving and stopping the back part. At the same time, the tail fin is moved further by the first pushing lever, so that it may move toward a side of the cutting blade of the fin cutter, whereby the back part from the back fin to the tail fin can be continuously and efficiently cut off by the fin cutter.

According to the invention, the second control means comprises the second pushing lever pushing the belly part of the backbone part. The belly part of the backbone part sandwiched and held by the pair of upper and lower conveyor belts is pushed by the second pushing lever immediately before reaching the kidney cutter and is moved in the direction of the width of the conveyor belts. The kidney-attached backbone section is cut off from the meat-attached backbone part by the kidney cutter in the state that the meat attached to the backbone part is protruded outward from the lateral end of the mutually opposite holding faces of the conveyor belts. Therefore, the kidney-attached backbone section can be accurately and efficiently cut off while keeping the backbone part, after cutting off of the fin part by the fin cutter, at the cutting position of the kidney with respect to the kidney cutter by the second pushing lever, by which the quality-meat-attached backbone section can be obtained at a high yield rate.

According to the invention, the device for separation of the backbone part comprises the upstream fixed guide plate and the downstream fixed guide plate respectively arranged between the conveyance starting end of the pair of upper and lower conveyor belts and the part before the fin cutter, and between the part immediately after the fin cutter and the part before the kidney cutter to receive and stop the back part of the backbone part and to guide the backbone part along the lateral end of the conveyor belts. Therefore, the backbone part can be conveyed while maintaining its posture with respect to the fin cutter and the kidney cutter, enabling accurate cutting because of the existence of the upstream fixed guide plate and the downstream fixed guide plate. The device further comprises a position correcting means comprising a roller arranged on the other lateral side of the conveyance starting end to push the belly side of the backbone part through the space between the mutually opposite holding faces of the conveyor belts to push the back part of the backbone part against the upstream fixed guide plate. Therefore, when the backbone part to be separated is fed to the conveyor belts, the need for accurate positioning is eliminated. Only by feeding the backbone part with the cut-off head side oriented in the conveying direction and with the back side oriented to the lateral side, the back part of the backbone part is pushed against the upstream fixed guide plate by the position correcting roller, so that the posture of the backbone part can be corrected to enable accurate cutting.

According to the invention, the first detecting sensor comprising the first photoelectric sensor is arranged to detect the passing time of the backbone part conveyed to the conveyance starting end of the conveyor belts and to calculate the length of the backbone part. Further, the second detecting sensor comprising the second photoelectric sensor is arranged to detect the backbone part conveyed to the part before the first pushing lever and to control the operation of the first pushing lever and the receiving and stopping lever according to the length of the backbone part detected by the first detecting sensor. Further, the third detecting sensor comprising the third photoelectric sensor is arranged to detect the backbone part conveyed to the part before the second pushing lever and to control the operation of the second pushing lever according to the length of the backbone part detected by the first detecting sensor. Consequently, the first pushing lever, the receiving and stopping lever and the second pushing lever are operated according to the backbone part which may have different length or according to an interval of conveyance of the backbone part so as to accurately separate the backbone part into the fin part, the kidney-attached backbone section and the quality-meat-attached backbone section in sequence.

BRIEF DESCRIPTION OF THE DRAWINGS

FIG. 19 is a time-series table showing the state of operation of the second pushing lever.

PREFERRED EMBODIMENT OF THE INVENTION

Figure 1:
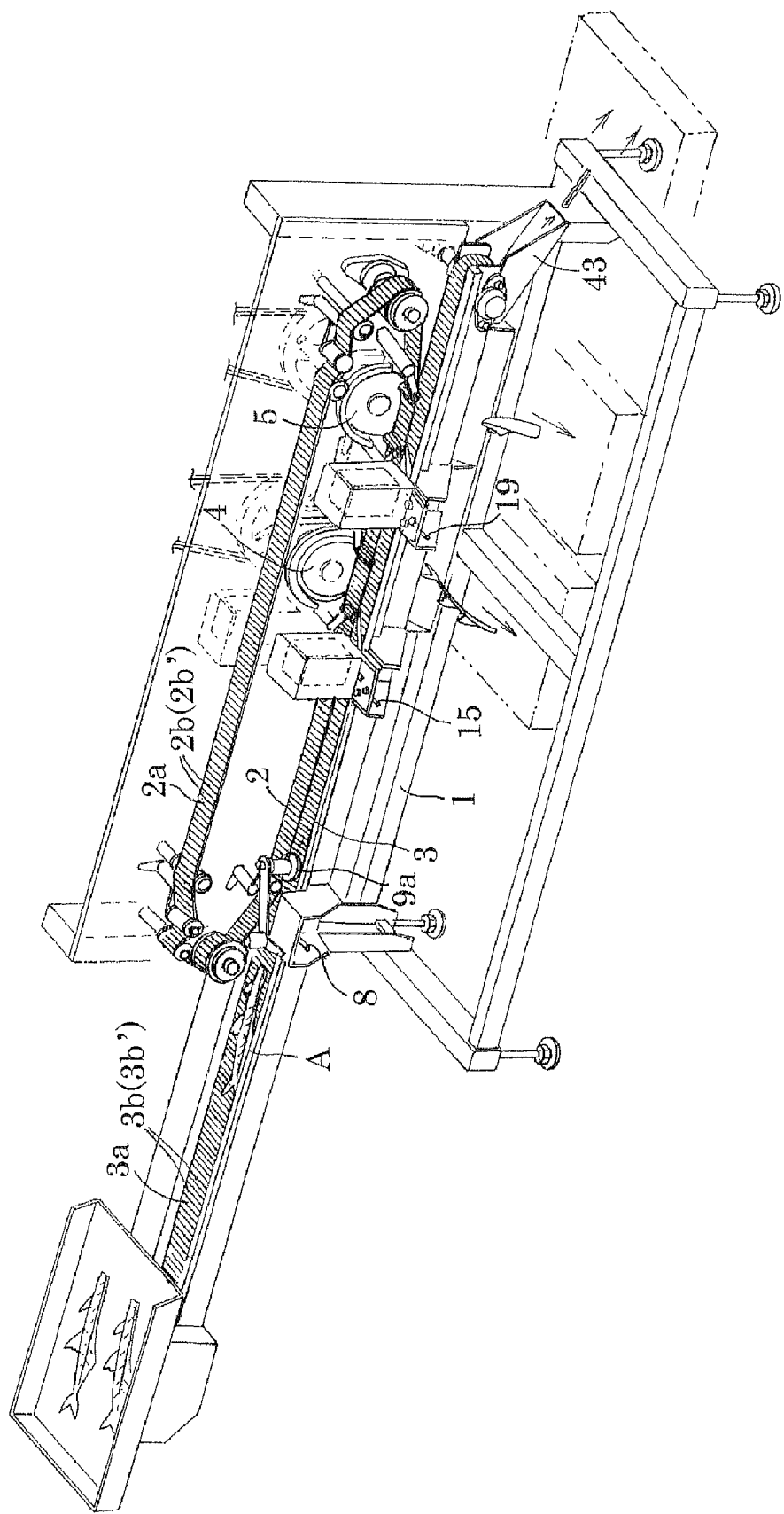
FIG. 1 is a simplified perspective view of the device for separation of a center bon of a fish, as a whole.
Figure 2:
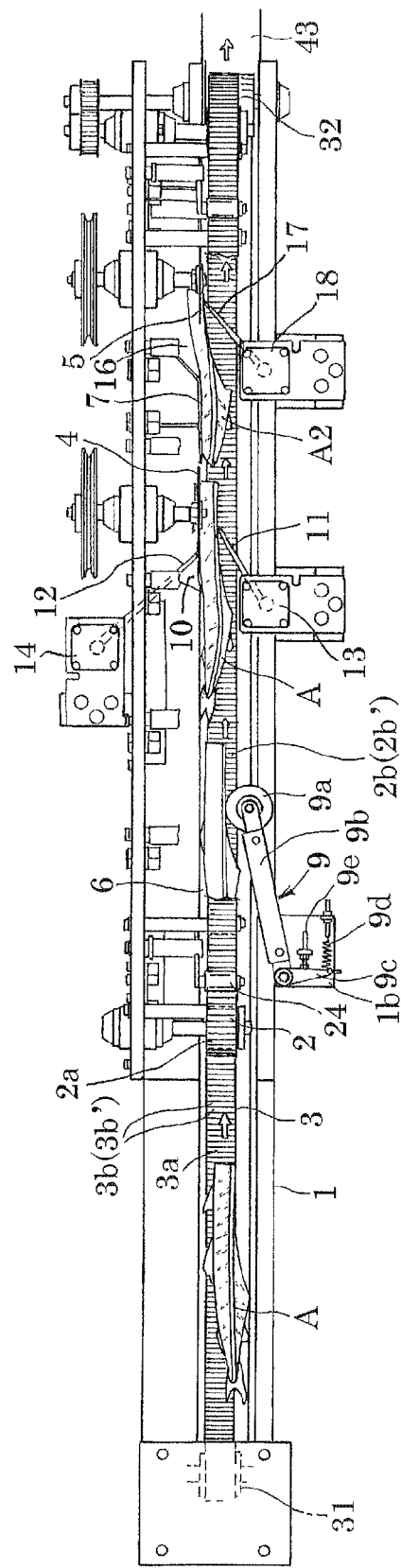
FIG. 2 is a simplified plan view of the device in the state that part of the upper conveyor belt is taken off.
Figure 3:
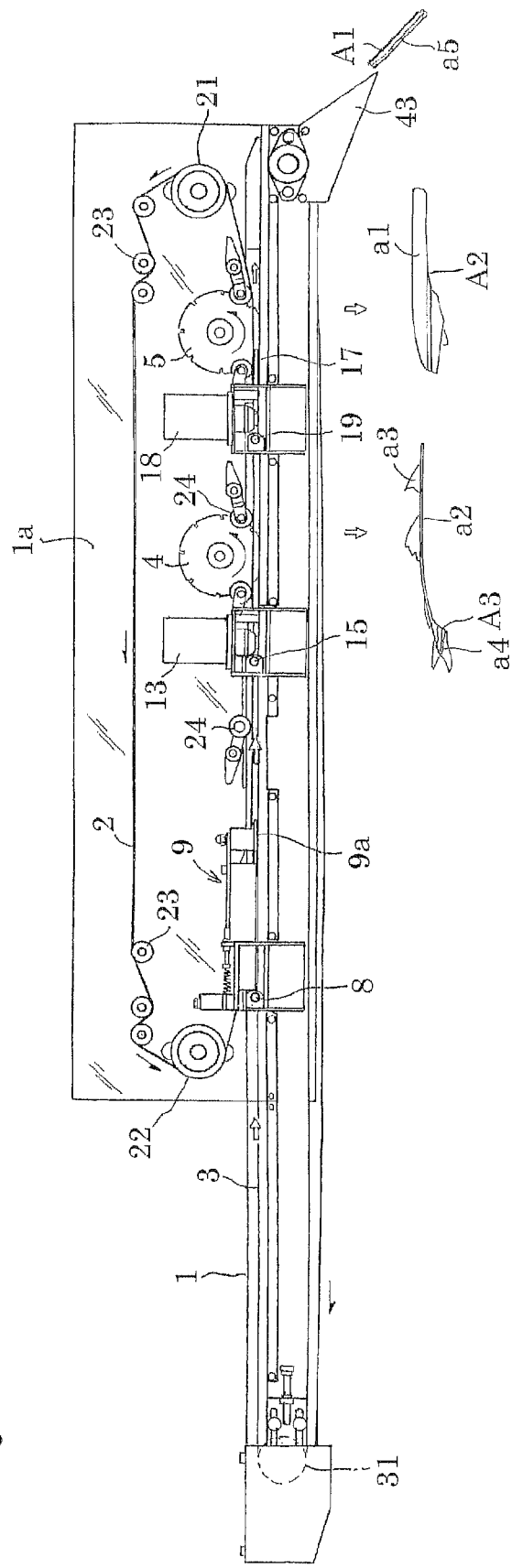
FIG. 3 is a simplified side view.
Figure 4:
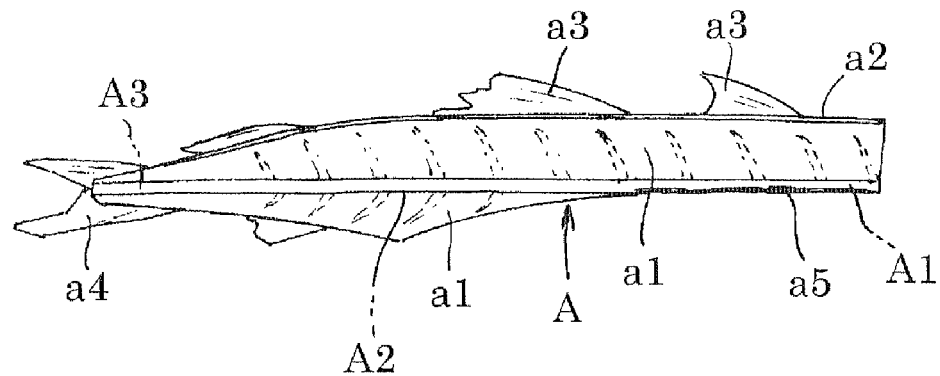
FIG. 4 is a plan view of the backbone part to be treated.
Figure 6:
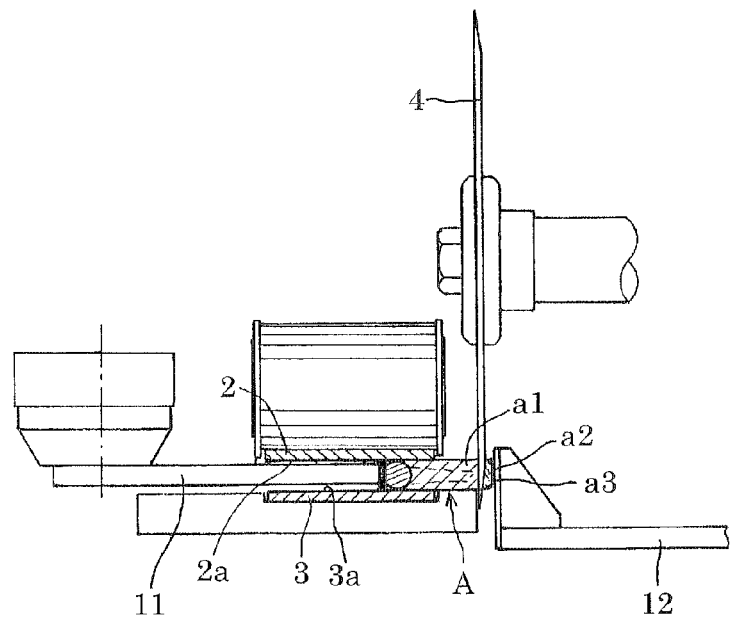
FIG. 6 is an enlarged front view of a main part of the fin cutter section.

An embodiment of the invention is described hereinafter based on the drawings. Namely, as shown in FIGS. 1 to 3, a pair of upper and lower conveyor belts 2, 3 comprising timing belts is arranged on a device body 1 to sandwich, hold and convey a backbone part A obtained when filleting a fish like Alaskan pollack into three. The backbone part A includes meat a1 which is left and attached to it after cutting off a belly part and two fillets on both sides of the fish, whose head has been cut off, by a filleting machine. As shown in FIG. 4, a back skin a2 including a back fin a3 is left on the back, and a kidney a5 is left on the belly side. Further, a tail fin a4 is left on a rear end of the backbone part. The backbone part A with the meat is sandwiched and held between mutually opposite holding faces 2a, 3a of the conveyor belts 2, 3 as shown in FIG. 6 in a lying state with the cut-off head side in a conveying direction of the conveyor belts 2, 3 and the back side oriented to a lateral end of the conveyor belts 2, 3. A starting end of conveyance of the backbone part by the conveyor belts 2, 3 is defined as an upstream side.

The lower conveyor belt 3 of the pair of upper and lower conveyor belts 2, 3 is extended in an endless state over a driven pulley 31 and a driving pulley 32, which are rotatably supported to a fish conveyance starting end and a conveyance finishing end of the device base 1, respectively, by the intermediary of a guide pulley, which is not shown in the drawings, and is horizontally arranged along an upper surface of the device base 1 with the holding face 3a for the backbone part up. The upper conveyor belt 2 is extended in an endless state over a driving pulley 21 and a driven pulley 22, by the intermediary of a guide pulley 23, which are rotatably supported to a vertical fixed plate 1a arranged on a lateral end of the device base 1 in a manner of projecting upward. The driving pulley 21 and the driven pulley 22 are respectively arranged at the position leaving a predetermined space from the conveyance starting end toward the downstream side, and at the conveyance finishing end of the lower conveyor belt 3. The backbone part A is sandwiched and held under a predetermined holding pressure between the holding faces 2a, 3a of the conveyor belts 2, 3 by pushing a plurality of positions of the back face with pushing rollers 24 with the holding face 2a, facing the holding face 3a of the lower conveyor belt 3, down.

Narrow linear projections 2b, 3b having a predetermined height and narrow linear recesses 2b', 3b' having the depth same as the height of the linear projections 2b, 3b are formed on the holding faces 2a, 3a of the conveyor belts 2, 3 alternately and continuously in a longitudinal direction over the whole length of the belts. Each of the linear projections and recesses 2b, 2b', 3b, 3b' is formed at a right angle to the longitudinal direction of the conveyor belts 2, 3 over the whole length of the belts. Consequently, the backbone part A can be conveyed in the longitudinal direction of the conveyor belts 2, 3 without haphazard movements in the direction of conveyance by being engaged and stopped by the linear projections and recesses 2b, 2b', 3b, 3b'. In the meantime, the backbone part A can be moved in the direction of the width of the belts along the linear projections and recesses 2b, 2b', 3b, 3b' by the pushing force from the side of the belts.

Figure 7:
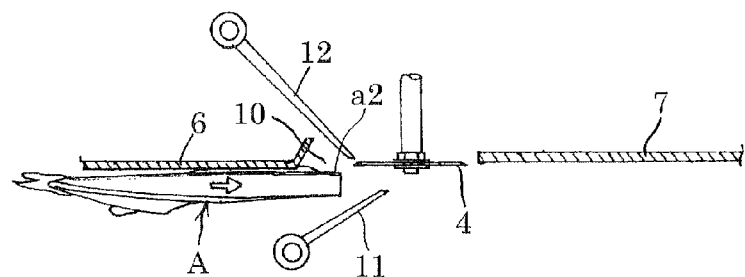
FIG. 7 is a simplified plan view showing the state immediately before starting of cutting off of the back fin part.
Figure 15:
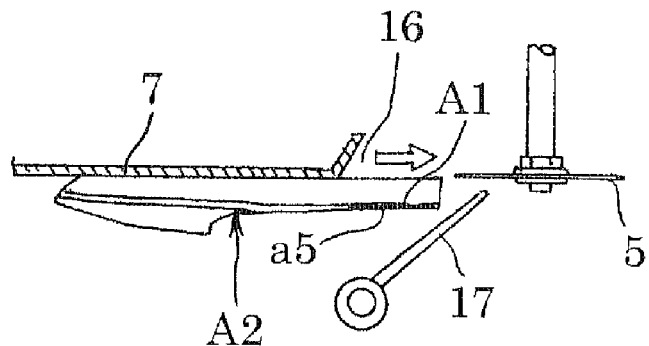
FIG. 15 is a simplified plan view showing the state immediately before starting of cutting off of the kidney part.

A fin cutter 4 is arranged on a lateral side of the conveyor belts 2, 3 in the midstream of conveyance of the backbone part A of the conveyor belts 2, 3 to cut off a back skin a2 of the backbone part A from a back fin a3 to a tail fin a4, and a kidney cutter 5 is arranged at a predetermined interval from the cutter 4 toward the downstream side to cut off a kidney-attached backbone section A1 which includes the kidney a5 left on the belly side of the backbone part A. Further, an upstream fixed guide plate 6, which is shown in FIGS. 2 and 7, having a predetermined height is arranged along a lateral end of the upper and lower conveyor belts 2, 3 to receive and stop the back of the backbone part A and to guide the backbone part A from the conveyance starting end of the conveyor belts 2, 3 to the position before the fin cutter 4. A downstream fixed guide plate 7, which is shown in FIGS. 2 and 15, having a predetermined height is arranged from the part immediately after the fin cutter 4 to the part before the kidney cutter 5 to receive and stop the back part of the backbone part A, from which the back skin a2 has been cut off, and to guide the backbone part A to the kidney cutter 5.

The upstream fixed guide plate 6, the downstream fixed guide plate 7, the fin cutter 4 and the kidney cutter 5 are arranged on a straight line along the lateral end of the upper and lower conveyor belts 2, 3. Each of the fin cutter 4 and the kidney cutter 5 comprises a circular cutting blade driven and rotated at a predetermined speed of rotation by a drive motor. The fin cutter 4 and the kidney cutter 5 are arranged vertically, and a lower peripheral part of each of them projects downward along the lateral end of the mutually opposite holding faces 2a, 3a of the pair of upper and lower conveyor belts 2, 3.

A first detecting sensor 8 comprising a photoelectric sensor emitting light to the lateral side through the space between the mutually opposite holding faces 2a, 3a of the conveyor belts 2, 3 is arranged on the other lateral side of the conveyance starting end of the conveyor belts 2, 3. The first detecting sensor 8 detects the time of passage of the backbone part A conveyed by the conveyor belts 2, 3, and calculates the length L of the backbone part A based on a conveyance speed of the conveyor belts 2, 3 and the time of passing of the backbone part A.

A position correcting means 9 is arranged at a short interval from the first detecting sensor 8 toward the downstream side to push the belly part side of the backbone part A to the lateral end of the conveyor belts 2, 3 in the direction of the width of the belts through the space between the mutually opposite holding faces 2a, 3a sandwiching and holding the backbone part A to push the back part of the backbone part A against the upstream fixed guide plate 6.

The position correcting means 9 comprises a position correcting roller 9a, a rotary lever 9b, a horizontal base plate 1b, a projecting member 9c, a spring 9d and a stopper 9e, as shown in FIG. 2. The position correcting roller 9a partially enters between the mutually opposite holding faces 2a, 3a of the pair of upper and lower conveyor belts 2, 3 in a freely advancing and retreating manner to push the back part of the backbone part A. The center of rotation of the position correcting roller 9a is rotatably pivoted to a front end of the rotary lever 9b. The horizontal base plate 1b is arranged on the other lateral side of the device base 1 opposite to the side where the fin cutter etc. exists. A base end of the rotary lever 9b is rotatably pivoted to the horizontal base plate 1b. The projecting member 9c is mounted on the base end of the rotary lever 9b at a right angle in a projecting manner. The spring 9d is arranged under tension between a front end of the projecting member 9c and an appropriate position of the horizontal base plate 1b to apply, at all times, a pushing force to the position correcting roller 9a, in the direction of the width of the belts, provided at a front end of the rotary lever 9b by the intermediary of the projecting member 9c. The stopper 9e receives and stops the projecting member 9c to hamper the position correcting roller 9a from moving to the upstream fixed guide plate 6 more than necessary by the force of the spring 9d.

There is a space 10 having no guide plate along the lateral end of the mutually opposite holding faces 2a, 3a of the conveyor belts 2, 3 between a finishing end of the upstream fixed guide plate 6 and the fin cutter 4 as shown in FIGS. 2 and 7. A first control means comprising a first pushing lever and a receiving and stopping lever 12 is arranged keeping a position of the space 10. The first pushing lever 11 pushes the belly side of the backbone part A, and the receiving and stopping lever 12 receives and stops the back part of the backbone part A with the force stronger than the pushing force of the pushing lever 11 in a manner that the mutually opposite holding faces 2a, 3a of the conveyor belts 2, 3 are interposed between the first pushing lever and the receiving and stopping lever 12. The first control means controls the cutting position of the fin of the backbone part A relative to the cutter 4.

Figure 5:
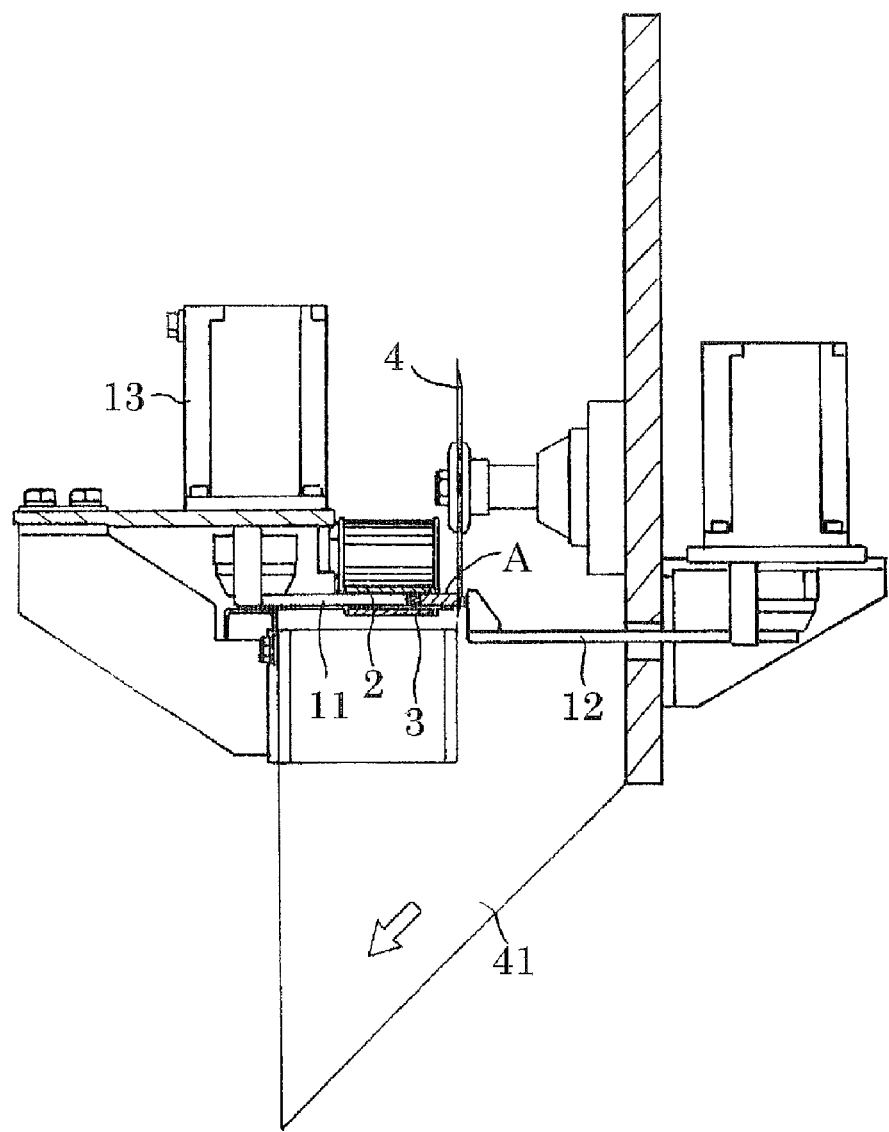
FIG. 5 is a front view of a fin cutter section.

The first pushing lever 11 is arranged on the lateral side of the conveyor belts 2, 3 opposite to the side where the fin cutter etc. exists, and at the position before the fin cutter 4. A base end of the first pushing lever 11 is positioned on the upstream side relative to the front end, and is fixed to a rotary shaft of a first servomotor 13. The first pushing lever 11 is inclined in a manner that it comes closer to the fin cutter 4 as it extends from the base end to the front end. In a normal state, as shown in FIGS. 5 and 6, the front end of the first pushing lever 11 is positioned near the opposite side of the backbone part cutting blade part of the fin cutter 4 and is inserted into the space between the mutually opposite holding faces 2a, 3a of the conveyor belts 2, 3 so that a head-cut-off end face of the backbone part A may be brought into contact with the front end, and the backbone part A may be pushed in the direction of the width of the belts by a predetermined pushing force toward the space 10.

The receiving and stopping lever 12 is arranged on a lateral side of the conveyor belts 2, 3 before the fin cutter 4 in a manner of facing the first pushing lever 11 and being interposed by the mutually opposite holding faces 2a, 3a of the conveyor belts 2, 3. The base end of the receiving and stopping lever 12 is positioned on the upstream side of the front end, and is fixed to a rotary shaft of the second servomotor 14. The receiving and stopping lever 12 is inclined in a manner that it comes closer to the fin cutter 4 as it extends from the base end to the front end. In a normal state, as shown in FIGS. 5 and 6, the front end of the receiving and stopping lever 12 is positioned on a side of the backbone part cutting blade of the fin cutter 4, and at an interval corresponding to the thickness of the back skin a2 of the backbone part A so that the fin cutter 4 may cut the back skin a2 together with the back fin a3 to the part near the tail fin while the back part of the backbone part A, which has been conveyed, is received and stopped.

Further, a second detecting sensor 15 comprising a second photoelectric sensor emitting the light to the lateral side of the conveyor belts 2, 3 through the space between the mutually opposite holding faces 2a, 3a of the conveyor belts 2, 3 is arranged on the other lateral side of the pair of upper and lower conveyor belts 2, 3 at the position before the first pushing lever 11. The second detecting sensor 15 detects the backbone part A conveyed by the pair of upper and lower conveyor belts 2, 3, and controls the operation of the first pushing lever 11 and the receiving and stopping lever 12 according to the length L of the backbone part A detected by the first detecting sensor 8.

Figure 12:
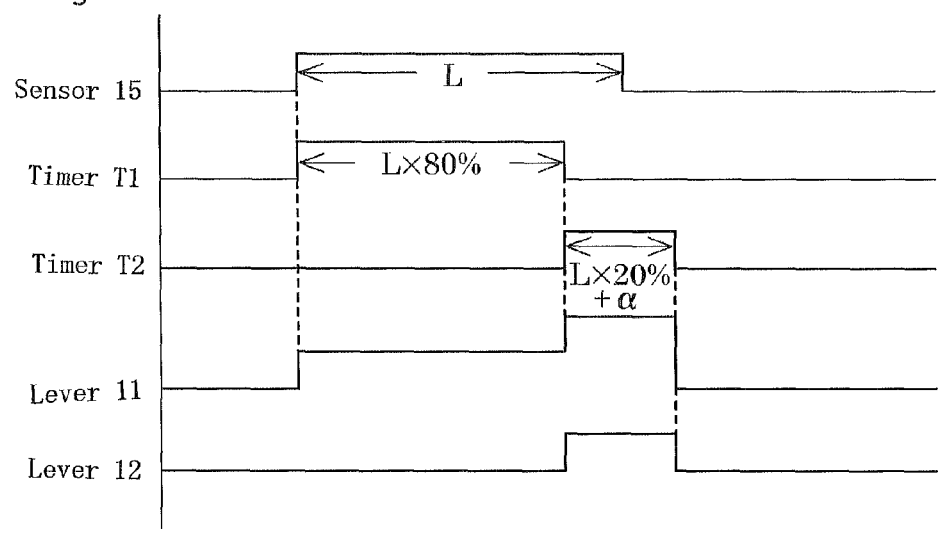
FIG. 12 is a time-series table showing the state of operation of the first pushing lever and the receiving and stopping lever.
Figure 13:
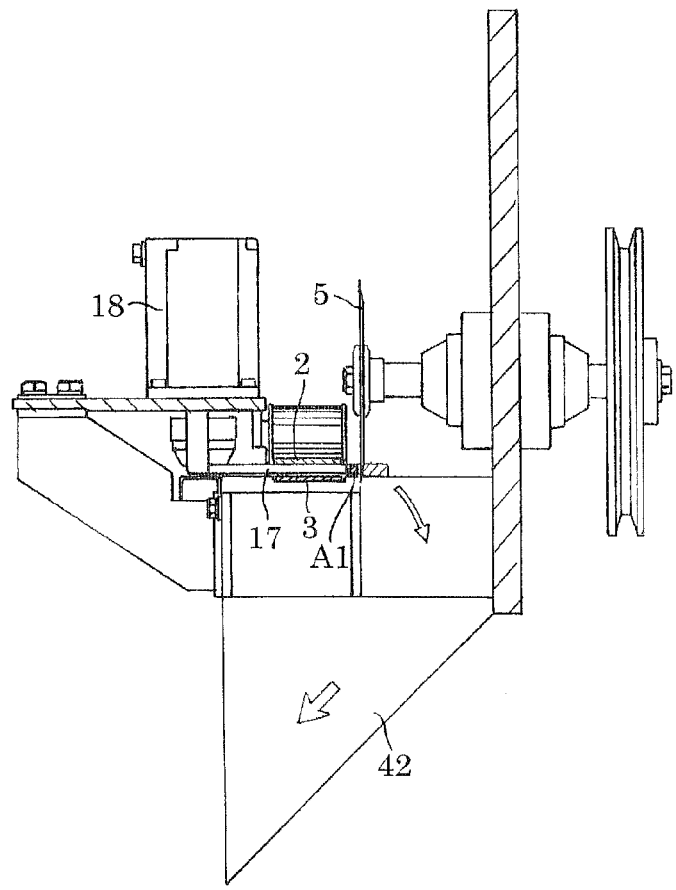
FIG. 13 is a front view of the kidney cutter section.
Figure 14:
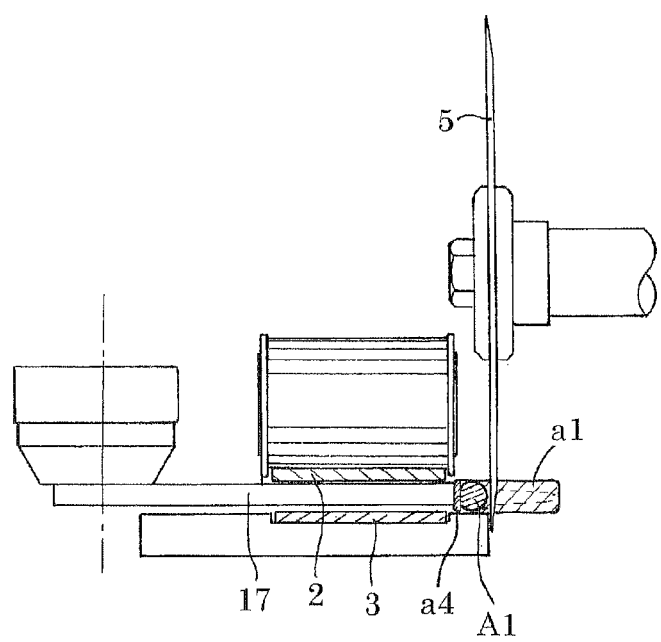
FIG. 14 is an enlarged front view of a main part of the kidney cutter section.

First and second timers T1, T2 are used to determine the time of control of operation of the first pushing lever 11 and the receiving and stopping lever 12. The control circuit is set up as follows. Namely, as shown in FIG. 12, the first timer T1 is operated only for the time needed for the length from the cut-off head side to the part near the tail of the backbone part A, or in other words, part of the conveyor belts 2, 3 having the length corresponding to 80% of the whole length of the backbone part A, for example, to pass the fin cutter 4. The second timer T2 is operated only for the time needed for the part of the conveyor belts 2, 3 having the length corresponding to the sum of the length corresponding to 20% of the length L of the backbone part A including the tail fin a4 plus an appropriate length α nearly equal to the 20% to pass the fin cutter 4.

Furthermore, when the second detecting sensor 15 detects the passage of the backbone part A, the first timer T1 is operated first to keep the pushing force of the first pushing lever 11 constant, and the back skin a2 of the backbone part A is cut off by 80% of the whole length L of the backbone part A from the cut-off head side by the fin cutter 4 while keeping the backbone part receiving and stopping force of the receiving and stopping lever 12 larger than the pushing force of the first pushing lever 11. Subsequent to the expiry of the time of the timer T1, the second timer T2 is operated to release the receiving and stopping force of the receiving and stopping lever 12, and the pushing force of the first pushing lever 11 is increased, so that the front end of the first pushing lever 11 is rotated to the lateral side in a manner of crossing before the cutting blade of the fin cutter 4. By rotation of the front end of the first pushing lever 11, the tail fin a4 is curved toward the space 10 provided from a side to the other side of the fin cutter 4 to have the state that the tail fin a4 crosses the cutting blade of the fin cutter 4, so that the fin cutter 4 may cut off the backbone section of the tail fin a4. The tail fin a4 and the back fin a3 are cut off in a continuous manner together with the back skin a2. After cutting, the first pushing lever 11 and the receiving and stopping lever 12 are returned to the original positions, respectively.

In the meantime, the receiving and stopping force of the receiving and stopping lever with respect to the backbone part A is set to be released when the backbone part A is cut off to 80% of the whole length from the cut-off head side by the fin cutter 4, however, needless to say, the percentage can be changed according to a shape etc. of the backbone part of the fish to be treated.

As shown in FIGS. 2 and 15, a space 16 having no guide plate is formed along the lateral end of the mutually opposite holding faces 2a, 3a of the conveyor belts 2, 3 and between the finishing end of the downstream fixed guide plate 7 arranged on the downstream side of the fin cutter 4 and the kidney cutter 5 like the space 10 formed between the upstream fixed guide plate 6 and the fin cutter 4. The second control means comprising a second pushing lever 17 pushing the belly side of the backbone part A is arranged on the other lateral side of the conveyor belts 2, 3 in a manner of facing the space 16.

The second pushing lever 17 has the thickness capable of being inserted into the space between the mutually opposite holding faces 2a, 3a of the conveyor belts 2, 3 similarly to the case of the first pushing lever 11. A base end of the second pushing lever 17 is positioned on the upstream side relative to the front end, and is fixed to a rotary shaft of a third servomotor 18 at the base end. The second pushing lever 17 is inclined in a manner that it comes closer to the kidney cutter 5 as it extends from the base end to the front end. In a normal state, the front end is arranged in the space between the mutually opposite holding faces 2a, 3a of the conveyor belts 2, 3 and at the position leaving the space enabling the kidney-attached backbone section A1 of the backbone part A to be cut off, while keeping a predetermined pushing force of the front end toward a side of the cutting blade part from the other side thereof. The backbone part A which is conveyed, is moved by the pushing force in the width direction of the belts toward the space 16, and the kidney-attached backbone section A1 is cut off by the kidney cutter 5.

Further, a third detecting sensor 19 comprising the third photoelectric sensor emitting the light toward the lateral side of the conveyor belts 2, 3 through the space between the mutually opposite holding faces 2a, 3a of the conveyor belts 2, 3 is arranged on the other lateral side of the conveyor belts 2, 3 before the second pushing lever 17. The third detecting sensor 19 detects the meat-attached backbone section A', from which the back part has been cut off and which is conveyed by the conveyor belts 2, 3, and controls the operation of the second pushing lever 17 according to the length of the backbone part A detected by the first detecting sensor 8.

Third and fourth timers T3, T4 control the time of operation of the second pushing lever 17. The control circuit is set up as follows. Namely, as shown in FIG. 19, the third timer T3 is operated only for the time needed for the part of the conveyor belts 2, 3 having the length corresponding to the length from the cut-off head side to the kidney-attached backbone section A1, including the kidney a5, of the length of the backbone part A determined by the first detecting sensor 8 to pass the kidney cutter 5. The fourth timer T4 is operated only for the time needed for the part of the conveyor belts 2, 3 having the length corresponding to the sum of the length corresponding to the rest of the length of the backbone part A and the length α' shorter than this length to pass the kidney cutter 5.

In this occasion, the time of operation of the third and fourth timers T3, T4 are set on the basis that the length of the kidney-attached backbone section A1 including the kidney a5 corresponds to substantially 40% of the whole backbone part length L, and the rest of the length corresponds to substantially 60%. However, needless to say, the time can be changed according to the kind etc. of the fish to be treated similarly to the case of the first and second timers T1, T2.

Furthermore, the control circuit is set up for enabling the following functions. Namely, when the third detecting sensor 19 detects the passage of the backbone part A, the third timer T3 is operated first, and a front end of the second pushing lever 17 is held, under a predetermined pushing force toward a side of the cutting blade part from the other side thereof, at the position leaving the space enabling the kidney-attached backbone section A1, including the kidney a5, of the backbone part A to be cut off, so as to cut off the kidney-attached backbone section A1 by the kidney cutter 5. When the time of the third timer T3 expires, the fourth timer T4 is then operated to allow a third pushing lever 17 to go beyond the cutting blade of the kidney cutter 5 and to rotate to the side of the kidney cutter 5, by which the part between the kidney-attached backbone section A1 and the meat-attached backbone section including the quality meat a1 is cut off by the kidney cutter 5, and the second pushing lever 17 returns to the original position after the cutting.

The pushing force of the first pushing lever 11 and the receiving and stopping lever 12 comprising the first control means controlling the cutting position of the fin of the backbone part A relative to the fin cutter 4, and the pushing force of the second pushing lever 17 comprising the second control means controlling the cutting position of the kidney-attached backbone section A1 including the kidney a5 relative to the kidney cutter 5 are set up by controlling each of the rotation torque of the rotary shafts of the servomotors 13, 14, 18 actuating the levers 11, 12, 17. A back skin discharging chute 41 is to discharge the back skin a2 including the fins cut off from the backbone part A by the fin cutter 4. The discharging chute 41 is arranged below the fin cutter 4. A backbone part discharging chute 42 is to discharge the meat-attached backbone section A2 including the quality meat a1 separated from the kidney-attached backbone section A1 by the kidney cutter 5. A kidney-attached backbone section discharging chute 43 is mounted on a conveyance finishing end of the pair of upper and lower conveyor belts 2, 3.

The backbone part A, which is obtained by filleting a fish like Alaskan pollack into three pieces by using a filleting machine, is separated into the back skin a2, including a series of the back fin a3 and the tail fin a4, the kidney-attached backbone section A1, and the meat-attached backbone section A2 by using the backbone part separating device structured as mentioned above. The method of this separation is explained hereinafter.

First, the backbone part A is placed on the lower holding face 3a of the lower conveyor belt 3 exposed on an end of the device base 1 on the upstream side of a backbone part holding starting end of the upper and lower conveyor belts 2, 3 with the cut-off head side oriented to the downstream side and with the back skin a2 facing the upstream fixed guide plate 6, as shown in FIG. 2. The backbone part A is conveyed by the lower conveyor belt 3 to the backbone part holding starting end of the lower conveyor belt 3 and the upper conveyor belt 2, and is conveyed to the downstream side at a predetermined speed while being sandwiched and held by the mutually opposite holding faces 2a, 3a of the pair of upper and lower conveyor belts 2, 3.

When the backbone part A conveyed to the downstream side while being sandwiched and held by the conveyor belts 2, 3 passes the first detecting sensor 8, which is arranged on the other lateral side of these conveyor belts 2, 3 opposite to the side where the upstream fixed guide plate 6, immediately after being sandwiched and held by the conveyor belts 2, 3, the backbone part A interrupts the light emitted from the first detecting sensor 8 through the space between the mutually opposite holding faces 2a, 3a of the conveyor belts 2, 3. The time of interruption is detected by the first detecting sensor 8. The length L of the backbone part A is calculated based on the time of interruption and the conveyance speed of the conveyor belts 2, 3. The fin cutter 4 and the kidney cutter 5 are controlled by the control circuit based on the detection signal of the length L of the backbone part A as described hereinafter.

When the backbone part A which has passed the first detecting sensor 8 reaches the position correcting means 9, it hits the position correcting roller 9a of the position correcting means 9 which is partially inserted into the other lateral side of the mutually opposite holding faces 2a, 3a of the conveyor belts 2, 3 opposite to the side where the upstream fixed guide plate 6 exists. The position correcting roller 9a is allowed to run on an end face of the belly part of the backbone part A to push the belly part in the direction of the width of the belts. The position correcting roller 9a is rotatably supported to a front end of the rotary lever 9b. The rotary lever 9b is urged in the direction of pushing the position correcting roller 9a toward the belly side of the backbone part A by the force of a spring 9d. Consequently, the backbone part A is pushed in the direction of the width toward the lateral side of the conveyor belts 2, 3 by the pushing force of the position correcting roller 9a. The back part of the backbone part A is protruded outward from the lateral end of the mutually opposite holding faces 2a, 3a of the conveyor belts 2, 3 and is received and stopped by the upstream fixed guide plate 6. The backbone part A is conveyed to the downstream side by the conveyor belts 2, 3 while sliding on the upstream fixed guide plate 6.

The linear projections 2b, 3b and linear recesses 2b', 3b' are formed on the mutually opposite holding faces 2a, 3a of the conveyor belts 2, 3 alternately and continuously in a longitudinal direction of the belts. Therefore, the backbone part A can be moved easily in the width direction of the belts along the linear projections and recesses by the pushing force of the position correcting roller 9a.

When the backbone part A conveyed along the upstream fixed guide plate 6 while being sandwiched and held by the upper and lower conveyor belts 2, 3 reaches the second detecting sensor 15 arranged on the other lateral side of the conveyor belts 2, 3, opposite to the side where the upstream fixed guide plate 6 exists, and before the first pushing lever 11, and the second detecting sensor 15 detects the passage, a backbone part passage signal is output from the second detecting sensor 15 to the first and second timers T1, T2 to start up the first and second timers T1, T2 in sequence. The fin cutter 4 cuts off the back skin a2 of the backbone part A while the operation by the servomotors 13, 14 of the first pushing lever 11 and the receiving and stopping lever 12 comprising the first control means is controlled by the intermediary of the control circuit according to the length of the backbone part A after the backbone part A reaches the fin cutter 4.

Now, how the back skin a2 is cut off from the backbone part A by using the fin cutter 4 is explained in detail hereinafter. As shown in FIG. 12, the first timer T1 is actuated first by the backbone part passage detecting signal emitted from the second detecting sensor 15, and the first servomotor 13 for driving the first pushing lever 11 and the second servomotor 14 for driving the receiving and stopping lever 12 are actuated. As shown in FIG. 7, the front end of the first pushing lever 11 is held at the position in a manner of facing the head-cut-off end face of the backbone part A which is conveyed, and a predetermined rotation force toward the lateral side of the conveyor belts 2, 3, or in other words, a predetermined pushing force to push the belly part of the backbone part A toward the fin cutter 4 is applied to the first pushing lever 11 by the first servomotor 13 for driving the first pushing lever 11. In the state that the pushing force larger than that applied to the first pushing lever 11 is applied to the receiving and stopping lever 12 by the second servomotor 14 for driving the receiving and stopping lever 12, the front end of the receiving and stopping lever 12 is held at the position leaving the space corresponding to the thickness of the back skin a2 of the backbone part A from the side of the cutting blade part of the fin cutter 4, as shown in FIGS. 5 and 6.

Figure 8:
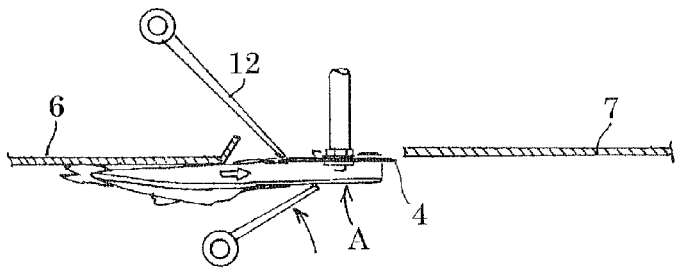
FIG. 8 is a simplified plan view showing the state that the back fin part is being cut.
Figure 9:
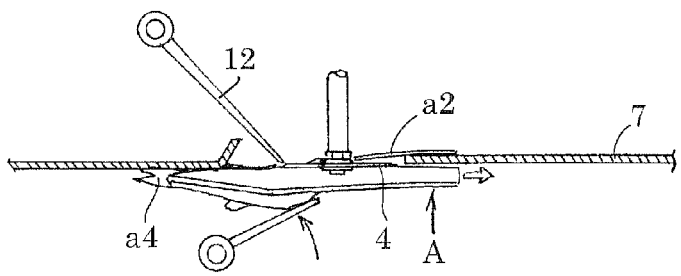
FIG. 9 is a simplified plan view showing the state immediately before finishing of cutting off of the back fin part.

When the backbone part A is sent to the fin cutter 4 along the space 10 between the finishing end of the upstream fixed guide plate 6 and the fin cutter while being sandwiched and held by the conveyor belts 2, 3 in this state, the head-cut-off end face of the backbone part A comes into contact with the front end of the first pushing lever 11, whereby the first pushing lever 11 is moved backward, and the first pushing lever 11 moves to the belly part of the backbone part A while being moved backward to push the belly part under a predetermined force, as shown in FIG. 8, while the back side of the backbone part A is received and stopped by the receiving and stopping lever 12 having larger receiving and stopping force than the pushing force of the first pushing lever 11. Consequently, the pushing force of the first pushing lever 11 only pushes the backbone part A to the fin cutter 4, but the backbone part A is not moved to the space 10 by the pushing force. Therefore, the back skin a2 is cut off to the side of the tail fin a4 by the fin cutter 4, as shown in FIG. 9, by the thickness corresponding to the space between the front end of the receiving and stopping lever 12 and the cutting blade of the fin cutter 4 according to the conveyance by the conveyor belts 2, 3 while the back part is received and stopped by the receiving and stopping lever 12.

In the meantime, when the fin cutter 4 starts cutting the backbone part A, the front end of the first pushing lever 11 comes into contact with the end face of the cut-off head part of the backbone part A, as described above, and moves to the belly part while being moved backward by the reaction force from the end face. Then, the front end of the first pushing lever 11 passes on the kidney a5 of the belly part, and even after it reaches the meat part projecting from the backbone part A in the width direction, the front end of the first pushing lever 11 moves backward along the projecting end face of the meat part while keeping the state of pushing the meat part.

Figure 10:
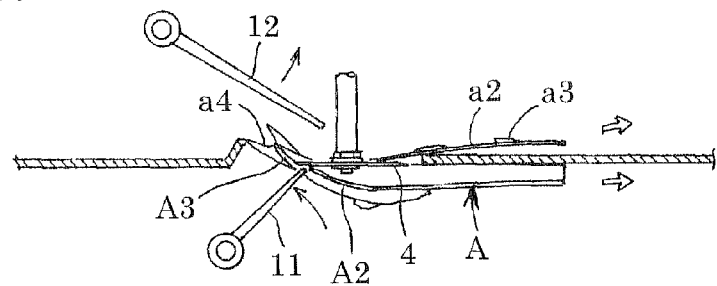
FIG. 10 is a simplified plan view showing the state of the tail fin part being cut.
Figure 11:
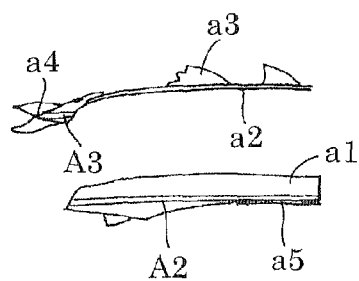
FIG. 11 is a plan view showing the state that a fin is separated from a meat-attached backbone part.

When the back skin a2 of the backbone part A is cut off from the cut-off head part to 80%, for example, of the whole length of the backbone part A by the fin cutter 4 and the time of the first timer T1 expires, the second timer T2 simultaneously starts up to actuate the second servomotor 14 for driving the receiving and stopping lever 12. As shown in FIG. 10, when the front end of the receiving and stopping lever 12 moves backward in a direction of moving away from the fin cutter 4 and the receiving and stopping force with respect to the back part of the backbone part A is released, the rotation torque of the first servomotor 13 for driving the first pushing lever 11 is simultaneously increased to rotate the front end of the first pushing lever 11 in the direction of protruding to the lateral side from the cutting blade of the fin cutter 4, by which a tail part including the tail fin 4 is curved from a side to the other side of the fin cutter 4 to obtain the state that the tail part crosses the cutting blade of the fin cutter 4. In this state, the tail part is cut off by the fin cutter 4 crossing a backbone part from the back side to the belly side. As shown in FIG. 11, the backbone part A is separated into the tail fin side backbone section A3 including the tail fin a4 and the continued back fin a3, and the meat-attached backbone section A2 including the quality meat a1. The tail fin a4 is separated from the meat-attached backbone section A2 in a state of being continued with the back skin a2 including the back fin, which is eliminated and discharged to the chute 41 through the space 10 between the upstream fixed guide plate 6 and the fin cutter 4.

The backbone part separation by the fin cutter 4 is carried out instantly when the backbone part A passes the fin cutter 4 at the predetermined speed. After the backbone part A is separated into the back skin a2 including the back fin a3 and the tail fin a4, and the meat-attached backbone section A2 including the quality meat a1, the first pushing lever 11 and the receiving and stopping lever 12 return to the original positions, respectively, and the time of the second timer T2 expires, so that a following backbone part conveyed in a similar manner can be treated for separation.

Figure 16:
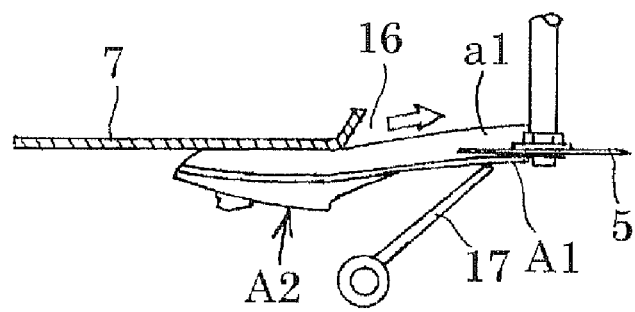
FIG. 16 is a simplified plan view showing the state that the kidney part is being cut.
Figure 17:
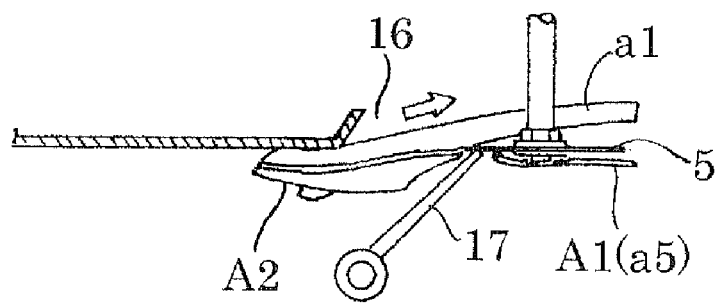
FIG. 17 is a simplified plan view showing the state immediately after finishing of cutting off of the kidney part.

The meat-attached backbone section A2 including the quality meat a1 is conveyed to the downstream side while being sandwiched and held by the conveyor belts 2, 3, and is brought to the position of the third detecting sensor 19. When the third detecting sensor 19 detects the quality-meat-attached backbone section A2, the third timer T3 is actuated first, and the third servomotor 18 of the second pushing lever 17 serving as the second control means is controlled, as shown in FIG. 19, by which the front end of the second pushing lever 17 is fixed at the position leaving the space corresponding to the thickness of the kidney-attached backbone section A1 in the state of maintaining the predetermined pushing force, as shown in FIGS. 15 to 17. The back side of the kidney-attached backbone section A1, or in other words, the meat-attached backbone section A2, which has been conveyed by the conveyor belts 2, 3, is cut off under the pushing force along the kidney-attached backbone section A1 by the kidney cutter 5.

The length of the kidney-attached backbone section A1 corresponds to substantially 40% of the whole length of the backbone part A. When the kidney a5 attached to the kidney-attached backbone section A1 is cut off by the kidney cutter 5 over the whole length to the end as shown in FIG. 17, the time of the third timer T3 expires and the fourth timer T4 is simultaneously actuated. By rotating the third pushing lever 17 to a side of the kidney cutter 5 beyond the cutting blade of the kidney cutter 5 by the third servomotor 18, continued section of the kidney-attached backbone section A1 and the meat-attached backbone section A2 is cut off from each other by the kidney cutter 5 to separate the kidney-attached backbone section A1 from the meat-attached backbone section A2. Then the kidney-attached backbone section A1 is conveyed to the downstream side in the state of being sandwiched and held by the conveyor belts 2, 3, and the meat-attached backbone section A2 is allowed to fall into the chute 42 through the space 16 between the finishing end of the downstream fixed guide plate 7 and the kidney cutter 5, and is collected in a container, which is not shown in the drawings, through a discharging end of the chute 42.

Figure 18:
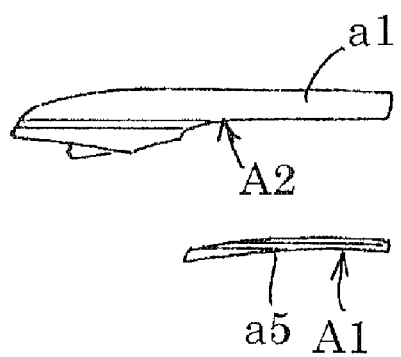
FIG. 18 is a plan view showing the state that the kidney-attached backbone section is separated from the meat-attached backbone section.

Thus, as shown in FIG. 18, after the backbone part A is divided into the kidney-attached backbone section A1 and the quality-meat-attached backbone section A2, the time of the fourth timer T4 expires and the second pushing lever 17 is returned to its original position to separate another backbone part A that is conveyed in a similar manner. The kidney-attached backbone section A1 sandwiched and held by the conveyor belts 2, 3 is discharged to the chute 42 from a finishing end of the conveyor belts 2, 3. By using the meat-attached backbone section A2, which is thus obtained, as a material for minced fish, quality minced fish can be manufactured. In the meantime, the first control means controlling the fin cutting position of the backbone part A with respect to the fin cutter 4, and the second control means controlling the cutting position of the kidney-attached backbone part A1 are materialized in a form of levers, however, rollers, plate members etc. which can move the backbone part A in the lateral direction of the conveyor belts 2, 3 may be used without being limited to the levers.

The invention claimed is:

1. A method of separation of a backbone part of a fish to obtain a quality-meat-attached backbone section comprising the steps of:
   a process of feeding a meat-attached backbone part, which is obtained when filleting the fish into three pieces, to a fin cutter and a kidney cutter arranged in sequence along a lateral end of mutually opposite holding faces of a pair of upper and lower conveyor belts while
   sandwiching and holding the meat-attached backbone part by the upper and lower conveyor belts in a state that a cut-off head side of the fish is oriented in a conveying direction and that a back side of the fish is oriented to a lateral side thereof, and then
   cutting off a back part of the backbone part from a back fin of the fish to a tail fin thereof by the fin cutter while controlling a cutting position of the fin of the backbone part relative to the fin cutter at the position of the fin cutter by a first control mechanism, and
   a process of cutting off the a kidney-attached backbone section of the fish by the kidney cutter while controlling a cutting position of the kidney-attached backbone section relative to the kidney cutter by a second control mechanism at a position of the kidney cutter.

2. The method of separation of the backbone part of the fish as claimed in claim 1, wherein the first control mechanism comprises a first pushing lever pushing a belly part of the backbone part and a receiving and stopping lever receiving and stopping the back part of the backbone part, in which the tail fin and the back fin are cut off in an integrated manner by cutting off the back part of the backbone part from the back fin to a part near the tail fin by the fin cutter in a state that the belly part of the backbone part sandwiched and held by the pair of upper and lower conveyor belts and brought to the fin cutter is pushed to the fin cutter by the first pushing lever and that the receiving and stopping lever receiving and stopping the back part of the backbone part is held at a position leaving that space, with respect to the fin cutter, enabling cutting off of the fin part of the backbone part, and then immediately before the tail fin of the backbone part reaches the fin cutter, operation of the receiving and stopping on the back part by the receiving and stopping lever is cancelled, and at a same time the tail fin section is pushed forward further by the first pushing lever to move the backbone part to a lateral side on a cutting blade of the fin cutter, by which the backbone section of the tail fin is cut off by the cutter.

3. The method of separation of the backbone part of the fish as claimed in claim 2, wherein the second control mechanism comprises a second pushing lever pushing the belly part of the backbone part sandwiched and held by the pair of upper and lower conveyor belts immediately before reaching the kidney cutter and moving the backbone part in a direction of a width of the conveyor belts while protruding a meat part attached to the backbone part outward from a lateral end of the mutually opposite holding faces of the conveyor belts so that the kidney-attached backbone part can be separated from the meat-attached backbone part by the kidney cutter.

4. The method of separation of the backbone part of the fish as claimed in claim 1, wherein the second control mechanism comprises a second pushing lever pushing a belly part of the backbone part sandwiched and held by the pair of upper and lower conveyor belts immediately before reaching the kidney cutter and moving the backbone part in a direction of a width of the conveyor belts while protruding a meat part attached to the backbone part outward from a lateral end of the mutually opposite holding faces of the conveyor belts so that the kidney-attached backbone part can be separated from the meat-attached backbone part by the kidney cutter.

5. A device for separation of the backbone part of a fish comprising:
   a pair of upper and lower conveyor belts conveying a meat-attached backbone part of the fish obtained when the fish is filleted into three pieces while being sandwiched and held in a state that a head side of the backbone part is oriented in a conveying direction and that a back side of the backbone part is oriented to another side;
   a fin cutter arranged along a lateral end of the conveyor belts and in a middle part of a conveyance thereof;
   a kidney cutter arranged in sequence to the fin cutter along a lateral end of the conveyor belts and in the middle part of the conveyance thereof;
   a first control mechanism arranged on a side of the fin cutter to control a cutting position of the fin of the backbone part relative to the backbone part; and,
   a second control mechanism arranged on a side of the kidney cutter to control a cutting position of a kidney-attached backbone section relative to the kidney cutter.

6. The device for separation of the backbone part of the fish as claimed in claim 5, in which the first control mechanism comprises:
- a receiving and stopping lever arranged on a side of the fin cutter to maintain a cutting position of a fin part of the backbone part relative to the fin cutter by receiving and stopping the fin part of the backbone part until a tail fin reaches the fin cutter when the fin cutter cuts off the fin part of the backbone part, and to release the receiving stopping force when the tail fin is cut off; and
- a first pushing lever arranged on an other side of the fin cutter in a manner of facing the receiving and stopping lever in order to push a belly part of the backbone part toward the receiving and stopping lever until the tail fin reaches the fin cutter when the fin cutter cuts off the fin part of the backbone part and to release the receiving and stopping force of the receiving and stopping lever while pushing the tail fin to a lateral side through a cutting blade of the fin cutter when the tail fin is cut off.

7. The device for separation of the backbone part as claimed in claim 6, in which the second control mechanism comprises a second pushing lever arranged on a lateral side of the conveyor belts before the kidney cutter to push a belly part side of the backbone part, from which a series of a back fin to a tail fin has been removed, to move the backbone part in a width direction of the conveying belts to position the kidney-attached backbone section at the cutting position by the kidney cutter.

8. The device for separation of the backbone part as claimed in claim 7, further comprising:
- an upstream fixed guide plate and a downstream fixed guide plate respectively arranged between a conveyance starting end of the pair of upper and lower conveyor belts and a part before the fin cutter, and between a part immediately after the fin cutter and a part before the kidney cutter along the lateral end of the conveyor belts, to receive and stop a back part of the backbone part to guide the backbone part; and
- a position correcting mechanism comprising a roller arranged on an other lateral side of the conveyance starting end to push the belly part side of the backbone part through a space between mutually opposite holding faces of the conveyor belts to push the back part of the backbone part against an upstream fixed guide plate of the pair of upper and lower conveyor belts.

9. The device for separation of the backbone part as claimed in claim 8, further comprising:
- a first detecting sensor including a photoelectric sensor arranged to detect passing time of the backbone part conveyed to the conveyance starting end of the conveyor belts and to calculate a length of the backbone part;
- a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and
- a third detecting sensor comprising a third photoelectric sensor arranged to detect the backbone part conveyed to a position before the second pushing lever and to control the operation of the second pushing lever according to the length of the backbone part detected by the first detecting sensor.

10. The device for separation of the backbone part as claimed in claim 7, further comprising:
- a first detecting sensor including a photoelectric sensor arranged to detect passing time of the backbone part conveyed to a conveyance starting end of the conveyor belts and to calculate a length of the backbone part;
- a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and
- a third detecting sensor comprising a third photoelectric sensor arranged to detect the backbone part conveyed to a position before the second pushing lever and to control the operation of the second pushing lever according to the length of the backbone part detected by the first detecting sensor.

11. The device for separation of the backbone part as claimed in claim 6, further comprising:
- an upstream fixed guide plate and a downstream fixed guide plate respectively arranged between a conveyance starting end of the pair of upper and lower conveyor belts and a part before the fin cutter, and between a part immediately after the fin cutter and a part before the kidney cutter along the lateral end of the conveyor belts, to receive and stop a back part of the backbone part to guide the backbone part; and
- a position correcting mechanism comprising a roller arranged on an other lateral side of the conveyance starting end to push a belly part side of the backbone part through a space between mutually opposite holding faces of the conveyor belts to push the back part of the backbone part against an upstream fixed guide plate of the pair of upper and lower conveyor belts.

12. The device for separation of the backbone part as claimed in claim 11, further comprising:
- a first detecting sensor including a photoelectric sensor arranged to detect passing time of the backbone part conveyed to the conveyance starting end of the conveyor belts and to calculate a length of the backbone part;
- a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and
- a third detecting sensor comprising a third photoelectric sensor arranged to detect the backbone part conveyed to a position before the second pushing lever and to control the operation of the second pushing lever according to the length of the backbone part detected by the first detecting sensor.

13. The device for separation of the backbone part as claimed in claim 6, further comprising:
- a first detecting sensor including a photoelectric sensor arranged to detect passing time of the backbone part conveyed to a conveyance starting end of the conveyor belts and to calculate a length of the backbone part;
- a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and a third detecting sensor comprising a third photoelectric sensor arranged to detect the backbone part conveyed to a position before the second pushing lever and to control the operation of the second pushing lever according to the length of the backbone part detected by the first detecting sensor.

14. The device for separation of the backbone part as claimed in claim 5, in which the second control mechanism comprises a second pushing lever arranged on a lateral side of the conveyor belts before the kidney cutter to push a belly part side of the backbone part, from which a series of a back fin to a tail fin has been removed, to move the backbone part in a width direction of the conveying belts to position the kidney-attached backbone section at the cutting position by the kidney cutter.

15. The device for separation of the backbone part as claimed in claim 14, further comprising:
    an upstream fixed guide plate and a downstream fixed guide plate respectively arranged between a conveyance starting end of the pair of upper and lower conveyor belts and a part before the fin cutter, and between a part immediately after the fin cutter and a part before the kidney cutter along the lateral end of the conveyor belts, to receive and stop a back part of the backbone part to guide the backbone part; and
    a position correcting mechanism comprising a roller arranged on an other lateral side of the conveyance starting end to push the belly part side of the backbone part through a space between mutually opposite holding faces of the conveyor belts to push the back part of the backbone part against an upstream fixed guide plate of the pair of upper and lower conveyor belts.

16. The device for separation of the backbone part as claimed in claim 15, further comprising:
    a first detecting sensor including a photoelectric sensor arranged to detect passing time of the backbone part conveyed to the conveyance starting end of the conveyor belts and to calculate a length of the backbone part;
    a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and
    a third detecting sensor comprising a third photoelectric sensor arranged to detect the backbone part conveyed to a position before the second pushing lever and to control the operation of the second pushing lever according to the length of the backbone part detected by the first detecting sensor.

17. The device for separation of the backbone part as claimed in claim 14, further comprising:
    a first detecting sensor including a photoelectric sensor arranged to detect passing time of the backbone part conveyed to a conveyance starting end of the conveyor belts and to calculate a length of the backbone part;
    a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and
    a third detecting sensor comprising a third photoelectric sensor arranged to detect the backbone part conveyed to a position before the second pushing lever and to control the operation of the second pushing lever according to the length of the backbone part detected by the first detecting sensor.

18. The device for separation of the backbone part as claimed in claim 5, further comprising:
    an upstream fixed guide plate and a downstream fixed guide plate respectively arranged between a conveyance starting end of the pair of upper and lower conveyor belts and a part before the fin cutter, and between a part immediately after the fin cutter and a part before the kidney cutter along the lateral end of the conveyor belts, to receive and stop a back part of the backbone part to guide the backbone part; and
    a position correcting mechanism comprising a roller arranged on an other lateral side of the conveyance starting end to push a belly part side of the backbone part through a space between mutually opposite holding faces of the conveyor belts to push the back part of the backbone part against an upstream fixed guide plate of the pair of upper and lower conveyor belts.

19. The device for separation of the backbone part as claimed in claim 18, further comprising:
    a first detecting sensor including a photoelectric sensor arranged to detect passing time of the backbone part conveyed to the conveyance starting end of the conveyor belts and to calculate a length of the backbone part;
    a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and
    a third detecting sensor comprising a third photoelectric sensor arranged to detect the backbone part conveyed to a position before the second pushing lever and to control the operation of the second pushing lever according to the length of the backbone part detected by the first detecting sensor.

20. The device for separation of the backbone part as claimed in claim 5, further comprising:
    a first detecting sensor including a photoelectric sensor arranged to detect passing time of the backbone part conveyed to a conveyance starting end of the conveyor belts and to calculate a length of the backbone part;
    a second detecting sensor comprising a second photoelectric sensor arranged to detect the backbone part conveyed to a position before the first pushing lever and to control operation of the first pushing lever and the receiving and stopping lever according to the length of the backbone part detected by the first detecting sensor; and
    a third detecting sensor comprising a third photoelectric sensor arranged to detect the backbone part conveyed to a position before the second pushing lever and to control the operation of the second pushing lever according to the length of the backbone part detected by the first detecting sensor.

\* \* \* \* \*